United States Patent
Li et al.

(10) Patent No.: US 9,588,228 B2
(45) Date of Patent: Mar. 7, 2017

(54) METHOD OF POSITIONING AND ELECTRONIC APPARATUS USING THE SAME

(71) Applicant: INSTITUTE FOR INFORMATION INDUSTRY, Taipei (TW)

(72) Inventors: Chih-Hung Li, New Taipei (TW); Dze-Min Jou, Taipei (TW); Chia-Chyang Chang, Taoyuan County (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 445 days.

(21) Appl. No.: 14/134,689

(22) Filed: Dec. 19, 2013

(65) Prior Publication Data

US 2015/0145721 A1   May 28, 2015

(30) Foreign Application Priority Data

Nov. 27, 2013   (TW) .............................. 102143283 A (51) Int. Cl.
| | | |
|---|---|---|
| *G01S 19/38* | (2010.01) | |
| *G01S 19/45* | (2010.01) | |
| *G01S 5/02* | (2010.01) | |
| *G01S 5/00* | (2006.01) | |

(52) U.S. Cl.
CPC ............ *G01S 19/45* (2013.01); *G01S 5/0036* (2013.01); *G01S 5/0263* (2013.01)

(58) Field of Classification Search
CPC ....... G01S 5/0036; G01S 5/0263; G01S 19/45
USPC ....... 342/126, 357.2–357.22, 357.34, 357.39
See application file for complete search history.

(56) References Cited

U.S. PATENT DOCUMENTS

| | | | | |
|---|---|---|---|---|
| 6,473,038 | B2 * | 10/2002 | Patwari ................ | G01C 21/206 342/450 |
| RE42,543 | E * | 7/2011 | Vayanos ................. | G01S 19/05 342/357.21 |
| 8,199,050 | B2 * | 6/2012 | Boyer ..................... | G01S 19/46 342/357.2 |
| 8,391,891 | B2 * | 3/2013 | Copeland .............. | H04W 64/00 342/357.2 |
| 8,395,548 | B2 * | 3/2013 | Hsu ....................... | G01S 5/0236 342/458 |
| 8,497,798 | B2 * | 7/2013 | Schloetzer ............ | G01S 5/0263 342/32 |

(Continued)

*Primary Examiner* — Marcus Windrich
(74) *Attorney, Agent, or Firm* — Li & Cai Intellectual Property (USA) Office (57) ABSTRACT

An electronic apparatus includes a selection unit, a storage unit and a processing unit. The selection unit and the storage unit are coupled to the processing unit. The selection unit selects a first reference point proximate to the electronic apparatus. The storage unit stores a plurality of second locations of a plurality of second reference points. The processing unit executes a single-point distance measurement between the electronic apparatus and a first location of the selected first reference point, provides the electronic apparatus auxiliary positioning information by selecting the second locations stored in the storage unit and generates a speculative location of the electronic apparatus by further computing the results of the single-point distance measurement and the auxiliary positioning information.

12 Claims, 6 Drawing Sheets

(56) References Cited

U.S. PATENT DOCUMENTS

| | | | | |
|---|---|---|---|---|
| 8,682,344 B2* | 3/2014 | Choi | ................... | G01S 5/0009 |
| | | | | 340/988 |
| 8,700,304 B1* | 4/2014 | Zhu | ........................ | G01C 5/00 |
| | | | | 342/357.34 |
| 2005/0168380 A1* | 8/2005 | Xu | ........................ | H04L 45/46 |
| | | | | 342/126 |
| 2007/0293237 A1* | 12/2007 | Correal | ................. | H04W 4/02 |
| | | | | 455/456.1 |
| 2008/0252516 A1* | 10/2008 | Ho | ....................... | G01S 5/0273 |
| | | | | 342/357.21 |
| 2009/0316601 A1* | 12/2009 | Zhu | .................... | H04W 64/003 |
| | | | | 370/254 |
| 2014/0184441 A1* | 7/2014 | Hwu | ...................... | G01S 19/41 |
| | | | | 342/357.24 |

\* cited by examiner

METHOD OF POSITIONING AND ELECTRONIC APPARATUS USING THE SAME

BACKGROUND

1. Field of the Invention

The instant disclosure relates to a method of positioning; in particular, to a method of single-point distance measurement and an electronic apparatus using the same.

2. Description of Related Art

Global Position System (GPS) has been widely used not only in military but also in daily life. The common implementation is target positioning and navigation. Conventional positioning apparatus (or navigation apparatus) employs GPS as the core functionality. GPS combines the advantages of satellites and wireless communication, such that precise information including position, speed or time can be provided swiftly.

GPS heavily relies on the collaboration between satellites, positioning apparatus and navigation software. However, it is very likely satellite signal is not available or weak because of the positioning apparatus is shielded by buildings. This may happen, for example, in the airport, among skyscrapers, in the underground or tunnels. Positioning cannot be accurately executed without the reception of satellite signals. Therefore, whenever GPS location information is needed, a user has to be outdoor so as to read GPS location information from satellites. The inability of obtaining GPS location information regardless where a user is causes certain inconvenience.

Cell tower signals have been used in positioning with the absence of a valid GPS location. For example, a mobile phone detects the signal strength from the surrounding cell towers. Accordingly, the approximate distance between the mobile phone and the cell towers is obtained. Meanwhile, the exact location of each cell tower can be identified through their code, and the mobile phone position can be estimated. The radio signal is capable of penetrating buildings, such that a portable device can be positioned indoor. Nevertheless, the location information is less accurate because the cell towers may be kilometers away from one another. In addition, radio signals attenuate due to building blockage. As a result, the accuracy of cell tower positioning is compromised.

On the other hand, Wireless Fidelity (Wi-Fi) system is widely used especially in urban area, and the number of wireless routers increases dramatically due to individual or industrial establishment. Wi-Fi Positioning System (WPS) takes the advantage of the high access point density and broad coverage and seeks the closer hot spots. In this regard, a speculative location of an application can be obtained from nearby access points.

Figure 1:
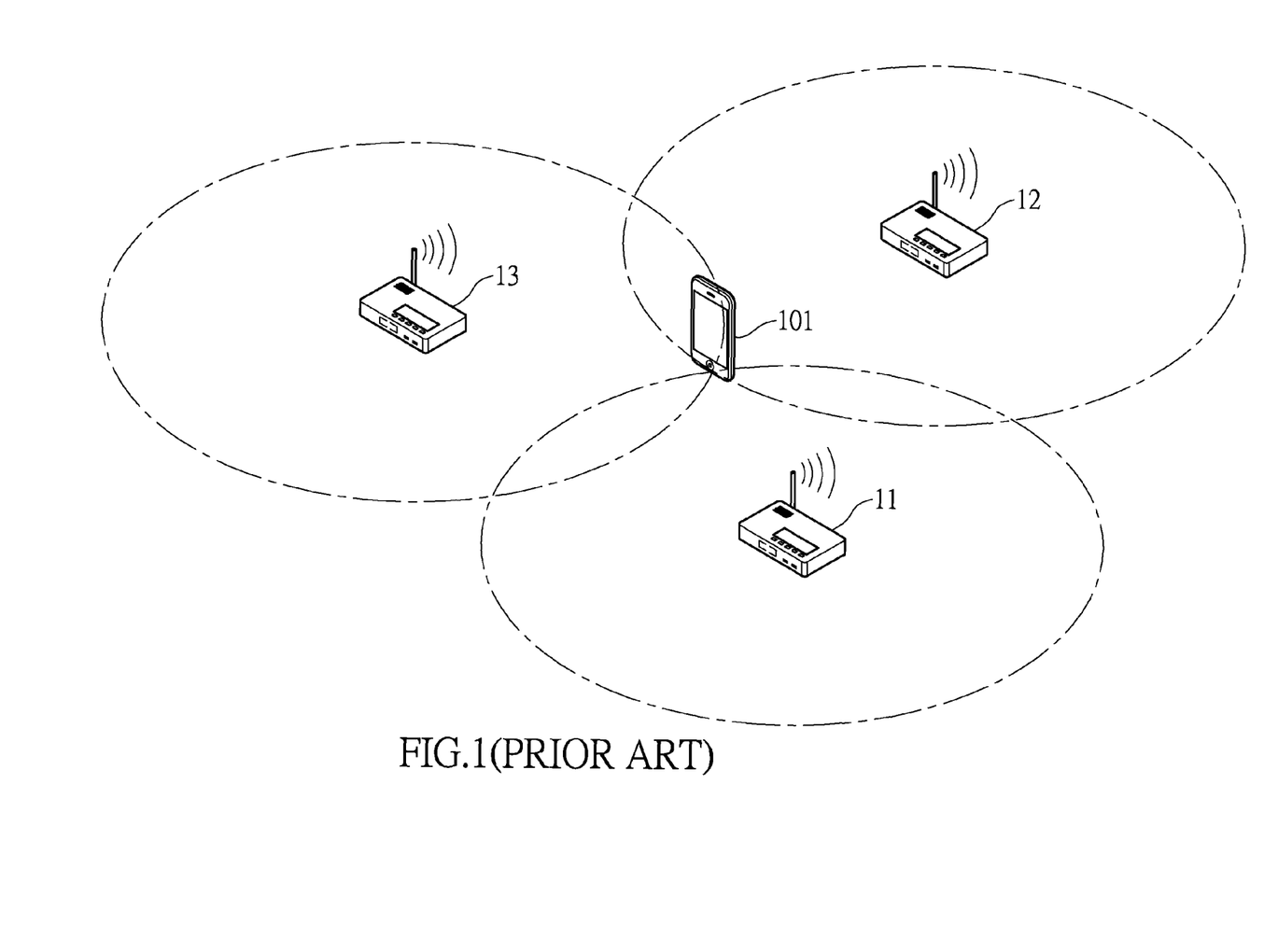
FIG. 1 is a schematic diagram showing conventional Wi-Fi positioning system.

Please refer to FIG. 1 showing a schematic diagram of conventional WPS. The access points are designated as 11, 12 and 13 and an electronic apparatus 101 (e.g. a mobile phone, tablet or the like). Firstly, the electronic apparatus 101 detects the media access control address (MAC) of the nearby access points 11-13 and the signal strength thereof. Then, the location information can be obtained by cross examination and calculation. However, WPS is rather limited to an area having higher density of the access points.

BRIEF SUMMARY OF THE INVENTION

The instant disclosure provides an electronic apparatus. According to one embodiment of the instant disclosure, the electronic apparatus includes a selection unit, a storage unit and a processing unit. The selection unit and the storage unit are coupled to the processing unit. The selection unit selects a first reference point proximate to the electronic apparatus. The storage unit stores a plurality of second locations of a plurality of second reference points. The processing unit executes a single-point distance measurement between the electronic apparatus and to a first location of the selected first reference point, provides the electronic apparatus auxiliary positioning information by selecting the second locations stored in the storage unit and generates a speculative location of the electronic apparatus by further computing the results of the single-point distance measurement and the auxiliary positioning information.

The instant disclosure provides a method of positioning electronic apparatus. According to one embodiment of the instant disclosure, the method includes the following steps. Firstly, a first reference point proximate to the electronic device is selected. Subsequently, the distance between the electronic apparatus and a first location of the first reference point is measured by single-point distance measurement. Then, auxiliary positioning information is provided by selecting a plurality of second locations of the second reference points stored in the electronic apparatus. Consequently, a speculative location of the electronic apparatus is generated according to the results of the single-point distance measurement and the auxiliary positioning information.

In summary, the instant disclosure provides accurate location information under single-point distance measurement compared to the GPS navigation or radio positioning system. As a result, much less computation is required, and the method of the instant disclosure is not restricted by the environment. It should be noted that in the instant disclosure, because of sufficient second reference points, the speculative coordination can be obtained by calculation. More specifically, the coordinate system is three-dimensional with a vertical axis and therefore compensates the flaws occurring in plane coordination. Overall, any industry or fields employing navigation system, including vehicle management, logistics, location based service (LBS), Geotagging in a digital camera, geographic information system (GIS) and disaster relief, will benefit from the instant disclosure.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE INVENTION

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It should be understood that the use of "first", "second", "third" or the like intends separate individual element. A first element and a second element are interchangeable. Also, "or" indicates one member or the combination of more than one member in a group.

Figure 2:
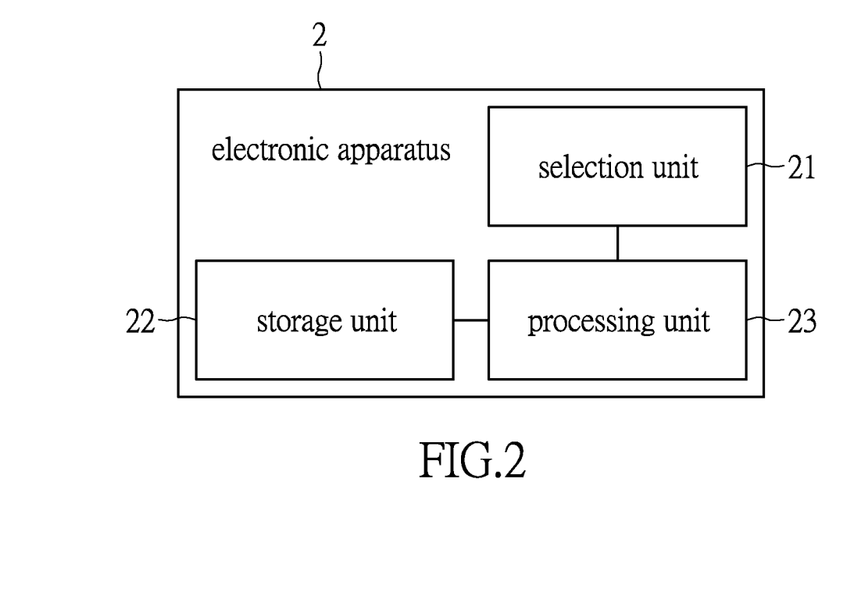
FIG. 2 is a block diagram showing an electronic apparatus in accordance with an embodiment of the instant disclosure.

Please refer to FIG. 2. FIG. 2 is a block diagram showing an electronic apparatus in accordance with an embodiment of the instant disclosure. The electronic apparatus 2 includes a selection unit 21, a storage unit 22 and a processing unit 23. The selection unit 21 and the storage unit 22 are couple to the processing unit 23. The electronic apparatus 2 may be, for example, mobile phone, tablet or the like, and the instant disclosure is not limited thereto.

The selection unit 21 selects a first reference point proximate to the electronic apparatus 2. When a user is to obtain location information from the electronic apparatus 2, the selection unit 21 searches access points or a specific landmark near to the electronic apparatus 2 as a first reference point, and then the reference point is used in a single-point distance measurement. More specifically, the selection unit 21 of the electronic apparatus 2 may further include a radio module, an infrared module, a laser module, an ultrasonic module, an image capture module or the like. The single-point distance measurement can be achieved by measuring the wavelength of radio, image, light or sound. A first distance is obtained by computing the distance between the first reference point and the electronic apparatus 2. The access point or the specific landmark may be a known spatial coordination, for example, a third-generation (3G) base station, a Long Term Evolution (LTE) base station, a Worldwide Interoperability for Microwave Access (WiMAX) base station, a radio base station, a Wireless Fidelity (Wi-Fi) apparatus, a Bluetooth apparatus, a Zigbee apparatus. Alternatively, the other landmark having known spatial coordination may also be used. The spatial coordination is a three-dimensional coordination, for example, GPS coordinate system via WGS84, TWD67 or TWD97, and the instant embodiment is not limited thereto.

The storage unit 22 stores a plurality of second locations of a plurality of second reference points. The electronic apparatus 2 stores the second locations of the second reference points in the storage unit 22. The second reference points may be the satellite locations of, for example, the Global Positioning System, Galileo, Global Navigation Satellite System (GLONASS) or BeiDou Navigation Satellite System (BDS). It should be noted that the satellite locations stored in the storage unit 22 can be updated according to the information provided by the supplier of the electronic apparatus 2. The electronic apparatus 2 does not need to relocate the second locations of the second reference points every time when GPS location information is required. In other words, the electronic apparatus 2 obtains location information from the storage unit 22 and processes following calculation immediately. In addition, the storage unit 22 can also serve to temporarily store other data (e.g., computed location or distance) in the positioning process. In the instant embodiment, the storage unit 22 may be non-volatile or volatile storage unit (e.g., ROM or RAM), and the instant embodiment is not limited thereto.

The processing unit 23 is couple to the selection unit 21 and the storage unit 22 and conducts the single-point distance measurement. The single-point distance measurement includes the measurement, which may require further computation, of the distance between the first location of the first reference point and the electronic apparatus 2. Subsequently, the second locations of the second reference point are selected from the storage unit 23. The generation of auxiliary positioning information relies on the selected second locations. More specifically, the auxiliary positioning information includes the distance information between the second reference point and the electronic apparatus 2. The distance between the first and second reference points can be obtained by the first location of the first reference point and the second locations of the second reference point. The first and second locations are three-dimensional coordination including X, Y and Z axes. The three-dimensional coordination is then converted into geographic coordination. After obtaining the results of the single-point distance measurement and the auxiliary positioning information, the processing unit 23 further computes and derives the speculative location of the electronic apparatus 2.

Figure 3:
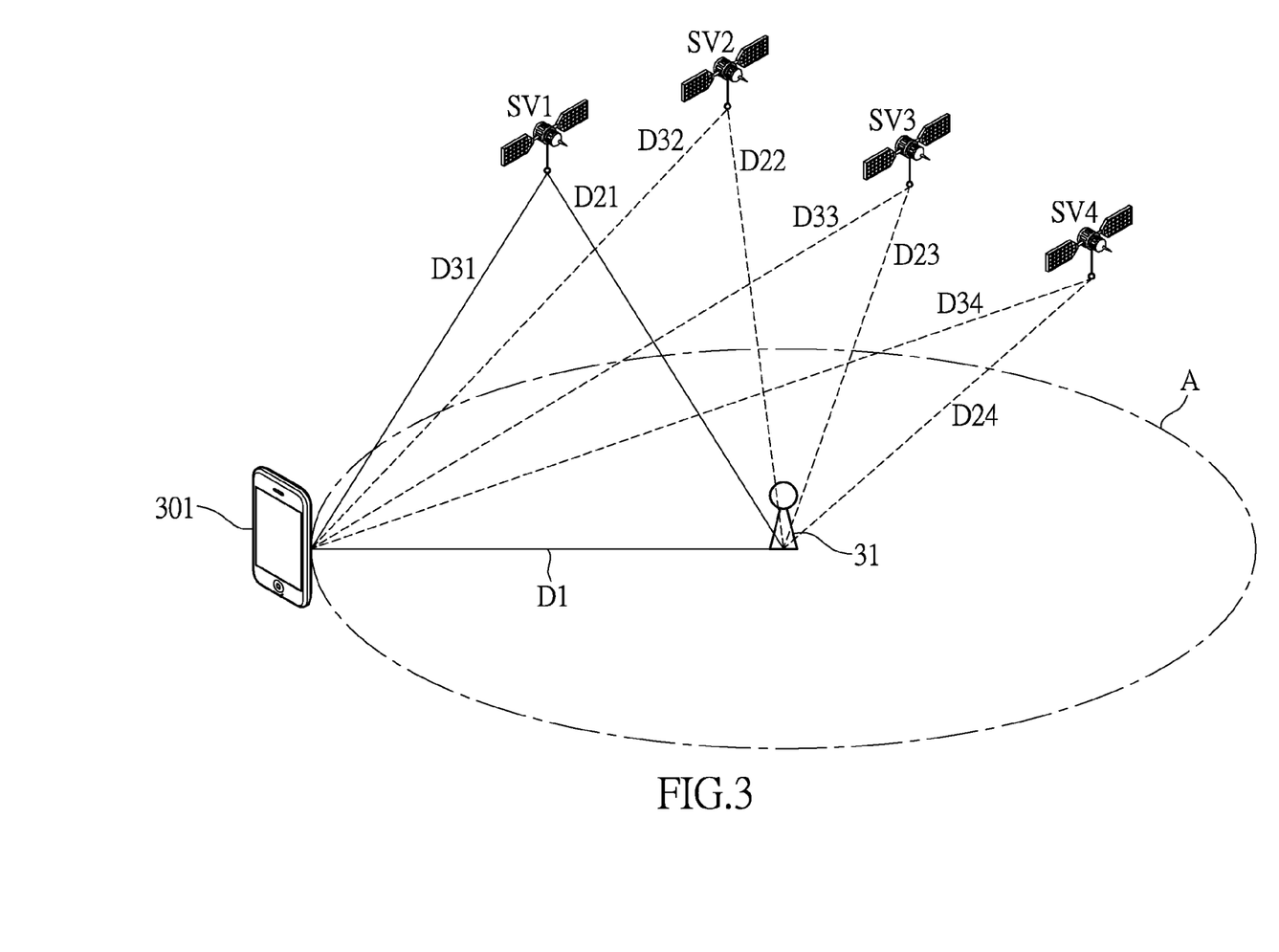
FIG. 3 is a schematic diagram showing positioning an electronic apparatus in accordance with an embodiment of the instant disclosure.

As shown in FIG. 3, after the user select the first reference point that has a known coordination like a base station or landmark, the processing unit 23 computes the distance between the first reference point and the electronic apparatus 301. The selection unit 21 may include a radio module, an infrared module, a laser module, an ultrasonic module or an image capture module. The distance measurement between the first reference point and the electronic apparatus 301 is achieved by measuring radio, image, light or sound waves. Please refer to FIG. 2 in conjunction with FIG. 3. FIG. 3 includes satellites SV1-SV4, the first reference point 31 and the electronic apparatus 301. The distance between the first reference point 31 and the satellites SV1-SV4 are designated as D21-D24. The distance between the electronic apparatus 301 to the satellites SV1-SV4 are designated as D31-D34. For example, after an image of the first reference point 31 is captured by the image capture module, the distance D1 between the first reference point 31 and the electronic apparatus 301 can be obtained by image processing (e.g., through a depth map). Alternatively, the electronic apparatus 301 can emit infrared signal from its infrared module, and the distance D1 between the first reference point 31 and the electronic apparatus 301 can be determined. The processing unit 23 may be a central processing unit, a micro control unit or the like, and the instant disclosure is not limited thereto.

The single-point distance measurement typically provides the information of distance D1 alone. That is to say, the estimated location of the electronic apparatus 301 may fall on a circumference having the first reference point 31 as the centre and the distance D1 as the radius. In practice, the actual location and the speculative location may differ from each other for up to twice the distance D1. Given that a wireless communication base station and the electronic apparatus 301 may be apart from each other for up to hundreds of meters to a few kilometers. Twice the distance D1 can make a great difference. Therefore, in the instant embodiment, other known spatial information is used to facilitate precisely positioning of the electronic apparatus 301. In other words, a more accurate location information of the electronic apparatus 301 can be obtained by computing both the selected first reference point 31 and the other known spatial coordination.

Figure 4:
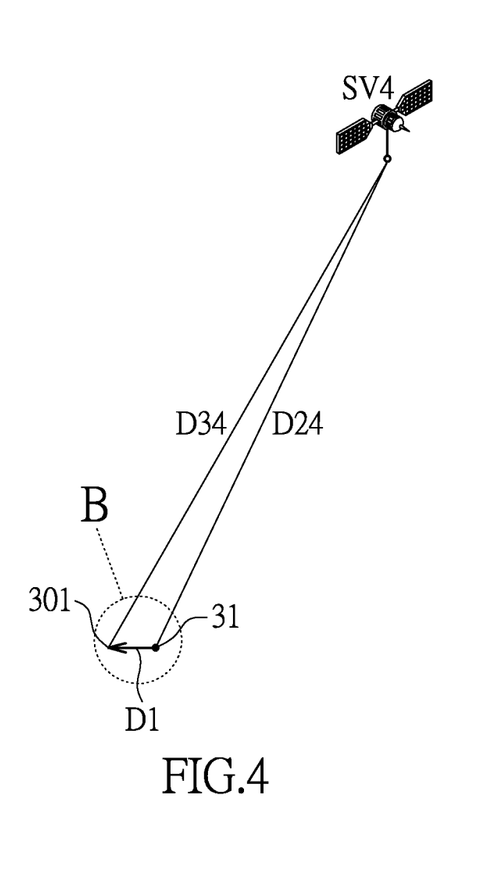
FIG. 4 is a schematic diagram showing positions and distances among an electronic apparatus, reference points and selected satellites in accordance with an embodiment of the instant disclosure.

The positioning process will be elaborated hereinafter. Please refer to FIG. 3 in conjunction with FIG. 4. FIG. 4 shows a schematic diagram of the electronic apparatus, the reference point, the location of the selected satellite and the distance therebetween. The satellite SV4, first reference point 31 and electronic apparatus 301 in FIG. 4 are identical to that of FIG. 3. Satellite SV4 is used as an example in the instant embodiment. For positioning the electronic apparatus 301, the electronic apparatus 301 is given a virtual coordination $(x_u, y_u, z_u)$. Then, the selection unit of the electronic apparatus 301 selects the first reference point 31 and obtains its spatial coordination $(x_0, y_0, z_0)$. In addition, the spatial coordination $(x_i, y_i, z_i)$ of any one of the satellites SV1-SV4 is selected from the second reference points stored in the storage unit of the electronic apparatus 301. According to the spatial coordination of the first reference point and one of the satellite $((x_4, y_4, z_4)$ in the instant embodiment because of the satellite SV4), the following equation is deduced:

The geometrical distance between the electronic apparatus 301 to the satellites SV1-SV4 (i.e., the distance D34 in FIG. 4) is derived from the following equation:

$$\rho_u^i = \sqrt{(x_u-x_i)^2 + (y_u-y_i)^2 + (z_u-z_i)^2} \quad (1)$$

The geometrical distance between the first reference point to the satellites SV1-SV4 (i.e., the distance D24 in FIG. 4) is derived from the following equation:

$$\rho_0^i = \sqrt{(x_0-x_i)^2 + (y_0-y_i)^2 + (z_0-z_i)^2} \quad (2)$$

It should be noticed that in the instant embodiment, the satellite SV4 acts as the second reference point, and the satellite SV4 is approximately 20,000 kilometers away from the first reference point. Thus the first reference point $(x_0, y_0, z_0)$ is further linearized as follow:

$$\rho_u^i = \rho_0^i + \frac{\partial \rho_u^i}{\partial x}(x_u - x_0) + \frac{\partial \rho_u^i}{\partial y}(y_u - y_0) + \frac{\partial \rho_u^i}{\partial z}(z_u - z_0) \quad (3)$$

In the equation (3):

$$g_{xi} = \frac{\partial \rho_u^i}{\partial x} = \frac{(x_0 - x_i)}{\sqrt{(x_0 - x_i)^2 + (y_0 - y_i)^2 + (z_0 - z_i)^2}} \quad (4)$$

$$g_{yi} = \frac{\partial \rho_u^i}{\partial y} = \frac{(y_0 - y_i)}{\sqrt{(x_0 - x_i)^2 + (y_0 - y_i)^2 + (z_0 - z_i)^2}} \quad (5)$$

$$g_{zi} = \frac{\partial \rho_u^i}{\partial z} = \frac{(z_0 - z_i)}{\sqrt{(x_0 - x_i)^2 + (y_0 - y_i)^2 + (z_0 - z_i)^2}} \quad (6)$$

Thus, the equation (3) is rearranged as:

$$\rho_u^i = \rho_0^i + g_{xi}(x_u-x_0) + g_{yi}(y_u-y_0) + g_{zi}(z_u-z_0) \quad (7)$$

In addition, $$\rho_u^i = \rho_0^i + [g_{xi} \ g_{yi} \ g_{zi}] \begin{bmatrix} x_u - x_0 \\ y_u - y_0 \\ z_u - z_0 \end{bmatrix} \quad (8)$$

Subsequently, the equation (8) is rearranged as:

$$\rho_u^i - \rho_0^i = G\delta X \quad (9)$$

It should be noted that:

$$\rho_u^i \approx \rho_0^i + D1 \quad (9)$$

More specifically, $\rho_u^i$ is close to the linear combination of $\rho_0^i$ and D1.

Figure 4A:
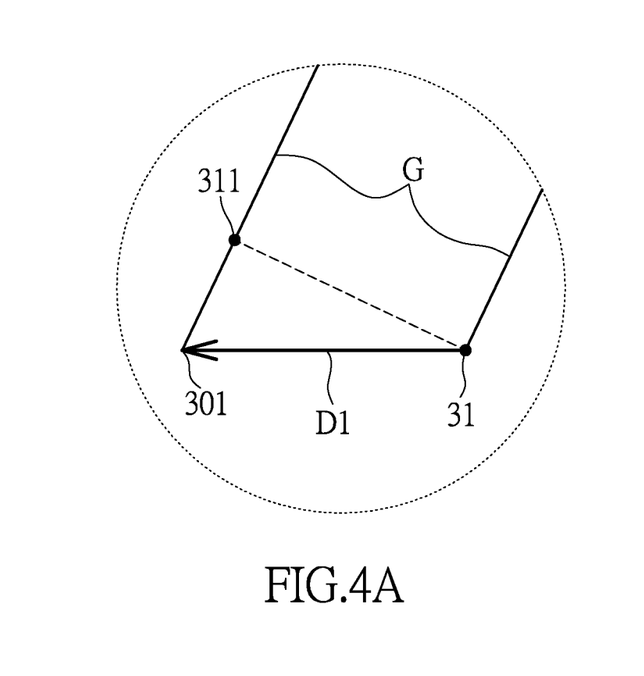
FIG. 4A is a partially enlarged view of FIG. 4.

Please refer to FIG. 4A which is an enlarged view of area B in FIG. 4. After linearization by the equation (3), the vector value G $[g_{xi} \ g_{yi} \ g_{zi}]$ in the equation (8) can be deduced (i.e., the unit vector G in FIG. 4A). For example, in FIG. 4A, a projection point 311 is the projection of the location of the first reference point 31 on the virtual line produced by distance D34, which is the distance between the satellite SV4 and the electronic apparatus 301. Consequently, the location of the electronic apparatus 301 is the coordination of the first reference point 31 plus the offset G$\delta$X.

The abovementioned equations employ a single satellite as the second reference point, and then the location of the electronic apparatus 301 is then generated. Furthermore, the speculative coordination of the electronic apparatus 301 can be more accurately generated through more satellites. More specifically, the electronic apparatus 301 selects more than one second reference points, which represent the satellites SV1-SV4, and the figures are used in equations (9) and (10). The location information is more accurate as more second reference points are selected and used by the electronic apparatus 301 and the spatial distribution therebetween is well balanced. In the instant embodiment, two major factors are used to compute distance and the location of the electronic apparatus 301. The two major factors are the first reference point, which is linearized, and the linear combination of the distance D1, which measures from the first reference point 31 to the electronic apparatus 301, and the distance between the first reference point 31 and the second reference point. A person skilled in the art may apply different equations or algorithms to obtain the distance, and the instant disclosure is not limited thereto.

Figure 5:
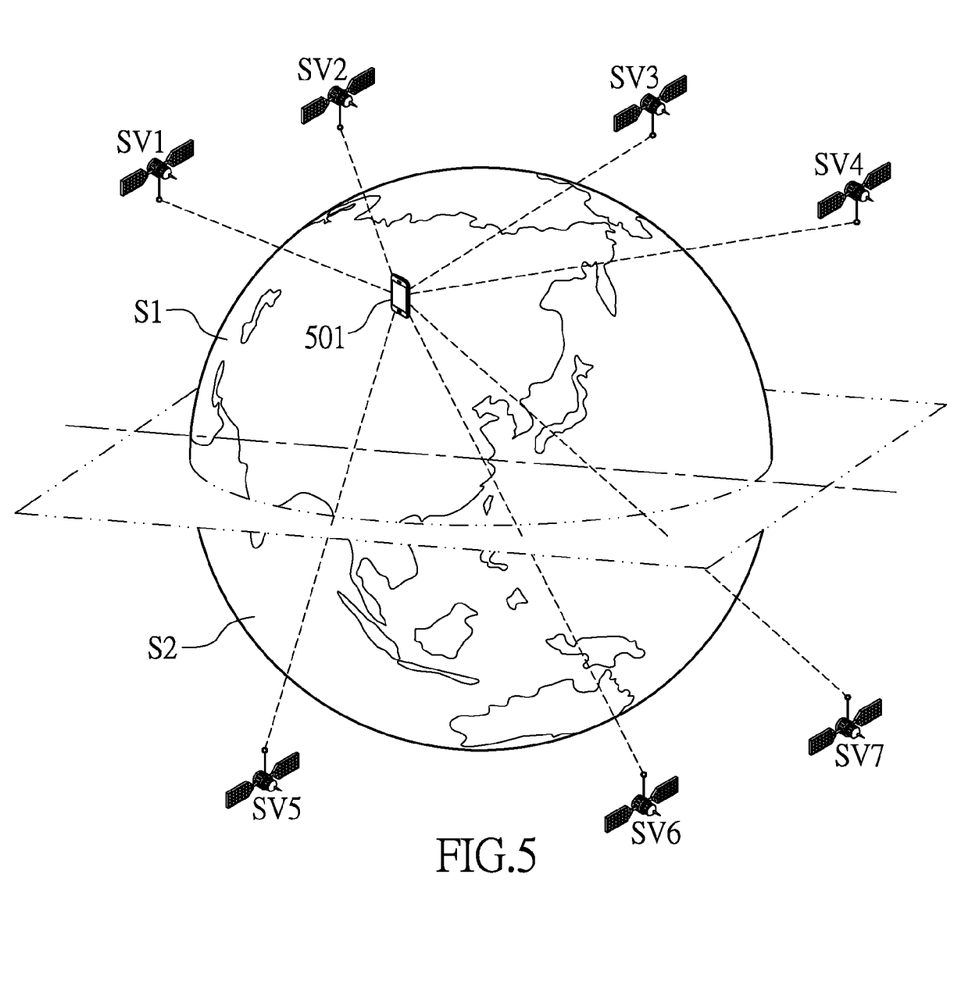
FIG. 5 is a schematic diagram showing satellite distribution available to an electronic apparatus in accordance with an embodiment of the instant disclosure.

Please refer to FIG. 5 which shows the satellite distribution which is available to the electronic apparatus. In FIG. 5, the electronic apparatus 501 and the satellites SV1-SV7 are shown. The satellites SV1-SV4 distribute below the apparent horizon S1, while the satellites SV 5-SV7 distribute under the apparent horizon S2. If the first reference point undergoes linearization, the first and the second reference points have to be parted in a specific range (approximately 20,000 kilometers). Thus, the first reference point and the electronic apparatus 501 cannot be too close to the second reference point. Otherwise, the linearization cannot be implemented. In the instant embodiment, the satellites SV1-SV7 provides more options to the electronic apparatus 501 and enhance the three-dimensional accuracy, especially the vertical axis (vector Z).

Figure 6:
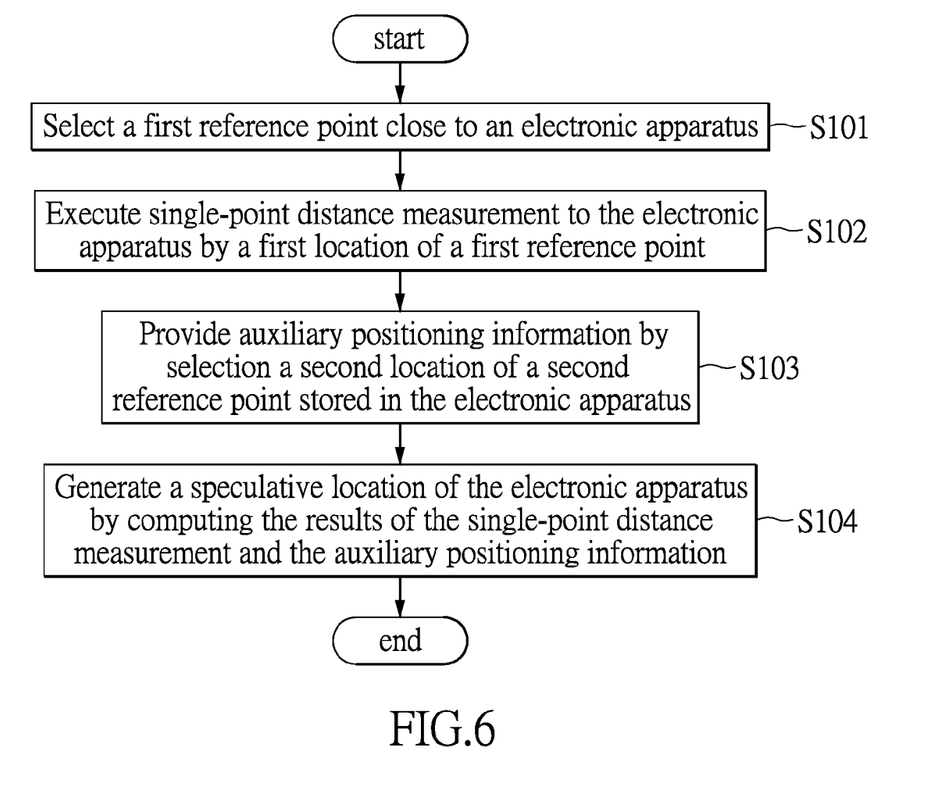
FIG. 6 is a flow chart showing a method of positioning in accordance with an embodiment of the instant disclosure.

Please refer to FIG. 6. FIG. 6 shows a flow chart of the method of positioning. The method of positioning includes, Step S101, the first reference point nearby the electronic apparatus is selected. In Step S102, the distance between the electronic apparatus and a first location of the first reference point is obtained by single-point distance measurement. In Step S103, the auxiliary positioning information is provided to the electronic apparatus by selecting a second location of the second reference points stored in the electronic apparatus. Finally, in Step S104, the location of the electronic apparatus is derived from computing the results of the single-point distance measurement and the auxiliary positioning information.

Please refer to FIG. 2. In Step S101, when the electronic apparatus undergoes positioning, the selection unit 21 searches nearby access points or specific landmarks as the first reference point. In Step S102, the processing unit 23 uses the first location of the first reference point and conducts the single-point distance measurement. Through single-point distance measurement, the distance between the first reference point and the electronic apparatus 2 can be obtained. In Step S103, the second location of the second reference point, which is stored in the storage unit 23, is selected, and the auxiliary positioning information is then provided. The auxiliary positioning measures the distance between the second reference point and the electronic apparatus 2. In Step S104, after the processing unit 23 obtains the results of the single-point distance measurement and the auxiliary positioning information, the speculative location of the electronic apparatus 2 is further computed.

In short, the instant disclosure provides accurate location information under single-point distance measurement in the absence of GPS navigation or radio positioning system. As a result, much less computation is required, and the method of the instant disclosure is not restricted to indoor or outdoor environment. Even though the user is located in a base-station-dense area, a single access point or a specific landmark can be positioning. The instant disclosure is not affected by the geometrical distribution, number or signal coverage of the access points. If the user is in a rural area (e.g., the mountains) where the base stations are scarce, accurate three-dimensional coordination can still be obtained as long as a single base station is recognized. In a disaster relief, this feature can greatly enhance the speed of target positioning. It should be noted that in the instant disclosure, because of sufficient second reference points, the speculative coordination can be obtained by calculation. More specifically, the coordination system is three-dimensional with a vertical axis (vector Z) and therefore compensates the flaws occurring in plane coordination. Overall, any industry or fields employing navigation system, including vehicle management, logistics, location based service (LBS), Geotagging in a digital camera, geographic information system (GIS) and disaster relief, will benefit from the instant disclosure.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An electronic apparatus comprising:
  a selection unit for selecting a first reference point proximate to the electronic apparatus;
  a storage unit for storing a plurality of second locations of a plurality of second reference points; and
  a processing unit coupled to the selection unit and the storage unit;
  wherein the processing unit conducts single-point distance measurement between the electronic apparatus and a first location of the selected first reference point, provides the electronic apparatus auxiliary positioning information by selecting the second locations stored in the storage unit and generates a speculative location of the electronic apparatus by further computing the result of the single-point distance measurement and the auxiliary positioning information;
  wherein the first location and the second locations are three-dimensional coordination including X, Y, and Z axes;
  wherein the single-point distance measurement includes the processing unit computing a first geometric distance between the first reference point and the electronic apparatus;
  wherein the auxiliary positioning information includes the processing unit respectively computing a plurality of second geometric distances between the first reference point and the second reference points.

2. The electronic apparatus according to claim 1, wherein the selection unit further includes a radio module, an infrared module, a laser module, an ultrasonic module or an image capture module.

3. The electronic apparatus according to claim 1, wherein the processing unit generates a plurality of third distances by computing the distance between the second reference points and the electronic apparatus.

4. The electronic apparatus according to claim 3, wherein the processing unit derives the speculative location of the electronic apparatus by computing the linearized coordination of the first location and the linear combination of the first geometric distance and the second geometric distance.

5. The electronic apparatus according to claim 1, wherein the first reference point is selected from a known spatial location of a third-generation (3G) base station, a Long Term Evolution (LTE) base station, a Worldwide Interoperability for Microwave Access (WiMAX) base station, a radio base station, a Wireless Fidelity (Wi-Fi) apparatus, a Bluetooth apparatus, a Zigbee apparatus, or a landmark.

6. The electronic apparatus according to claim 1, wherein the second reference points of the second locations stored in the storage unit are the satellite locations of the Global Positioning System, Galileo, Global Navigation Satellite System (GLONASS) or BeiDou Navigation Satellite System (BDS).

7. A method of positioning, adapted to an electronic apparatus, comprising:
  selecting a first reference point proximate to the electronic device;
  executing single-point distance measurement between the electronic apparatus and a first location of the first reference point, wherein the single-point distance measurement includes the processing unit computing a first geometric distance between the first reference point and the electronic apparatus;
  providing auxiliary positioning information by selecting a plurality of second locations of the second reference points stored in the electronic apparatus, wherein the auxiliary positioning information includes the processing unit respectively computing a plurality of second geometric distances between the first reference point and the second reference points; and
  generating a speculative location of the electronic apparatus according to the result of the single-point distance measurement and the auxiliary positioning information;
  wherein the first location and the second locations are three-dimensional coordination including X, Y, and Z axes.

8. The method of positioning according to claim 7, wherein the first distance is derived from radio frequency, image distance measurement, light distance measurement or sonic distance measurement.

9. The method of positioning according to claim 7, wherein the step of providing the auxiliary positioning information by selecting the second locations of the second reference points stored in the electronic apparatus further comprises:

generating a plurality of third distances between the second reference points and the electronic apparatus according to the auxiliary positioning information.

10. The method of positioning according to claim 9, wherein in the step of generating the plurality of third distance between the second reference points and the electronic apparatus according to the auxiliary positioning information, the speculative location of the electronic apparatus is derived from the linearization processing of the first reference point and the linear combination of the first geometric distance and the second geometric distance.

11. The method of positioning according to claim 7, wherein the first reference point is selected from a third-generation (3G) base station, a Long Term Evolution (LTE) base station, a Worldwide Interoperability for Microwave Access (WiMAX) base station, a radio base station, a Wireless Fidelity (Wi-Fi) apparatus, a Bluetooth apparatus or a Zigbee apparatus.

12. The method of positioning according to claim 7, wherein the second reference points are satellite locations of the Global Positioning System, Galileo, Global Navigation Satellite System (GLONASS) or BeiDou Navigation Satellite System (BDS).

* * * * *